Oct. 21, 1952 P. E. YACOBY 2,614,473
GARDEN TRACTOR WITH INTERCHANGEABLE POWER TOOL
Filed Jan. 27, 1949 3 Sheets-Sheet 1

Paul E. Yacoby
INVENTOR.

BY *Thomas A. O'Brien*
*and Harvey B. Jacobson*
Attorneys

Oct. 21, 1952          P. E. YACOBY          2,614,473
GARDEN TRACTOR WITH INTERCHANGEABLE POWER TOOL
Filed Jan. 27, 1949                                            3 Sheets-Sheet 2
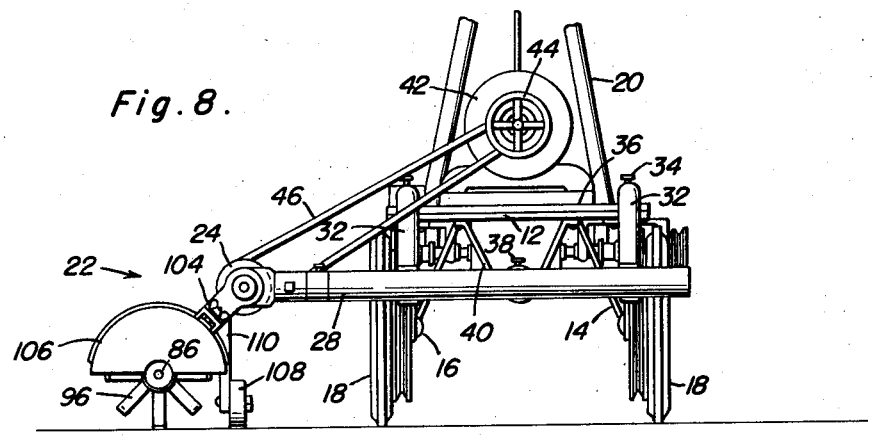
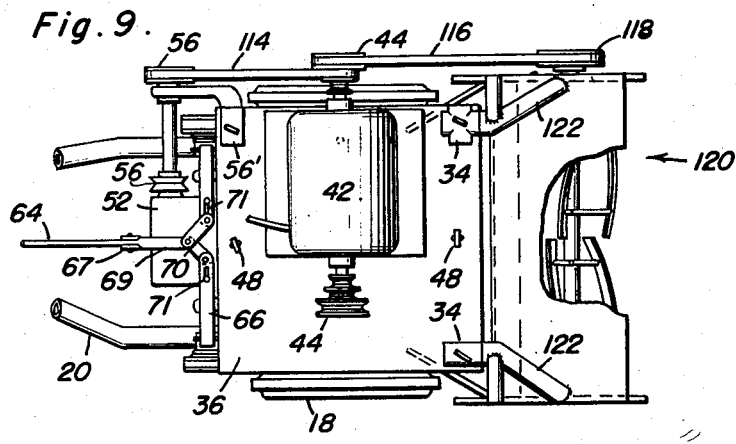
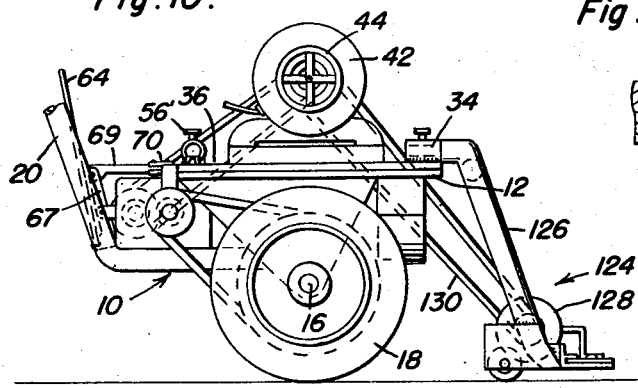
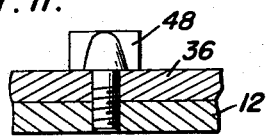
Paul E. Yacoby
INVENTOR.

Oct. 21, 1952  P. E. YACOBY  2,614,473
GARDEN TRACTOR WITH INTERCHANGEABLE POWER TOOL
Filed Jan. 27, 1949  3 Sheets-Sheet 3
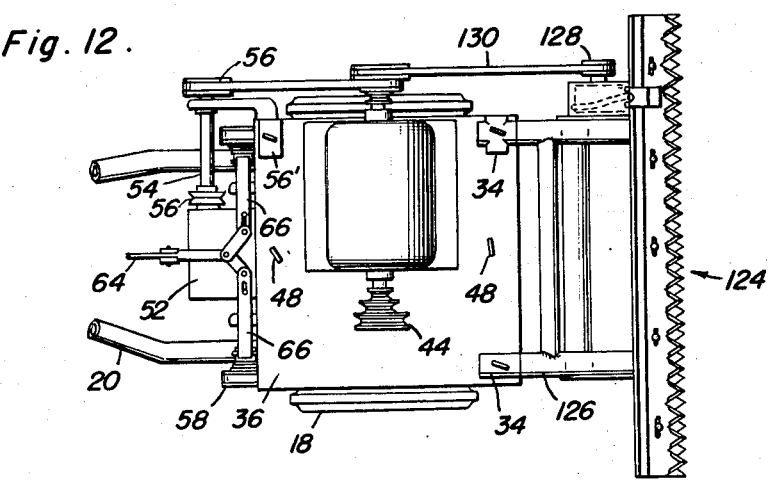
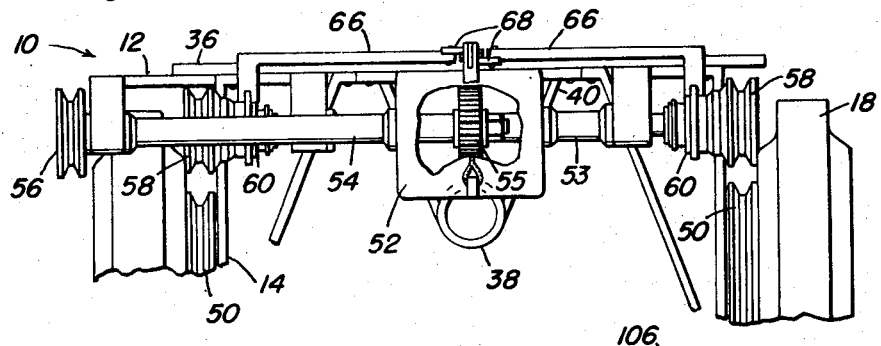
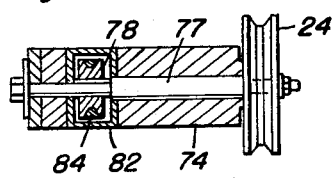
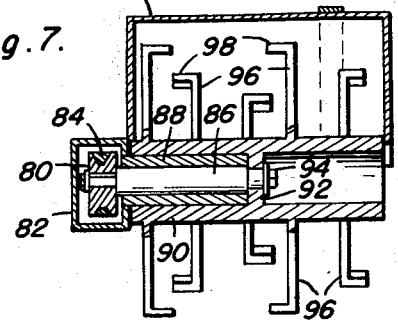
Paul E. Yacoby
INVENTOR.

Patented Oct. 21, 1952

2,614,473

UNITED STATES PATENT OFFICE 2,614,473

GARDEN TRACTOR WITH INTERCHANGEABLE POWER TOOL

Paul E. Yacoby, Seal Beach, Calif.

Application January 27, 1949, Serial No. 73,038

6 Claims. (Cl. 97—38)

This invention relates generally to an agricultural implement adapted to be operated by a walking attendant, and more particularly to a frame construction adapting the implement for use with a variety of attachments which can be selectively secured in operative positions upon the frame.

A first object of this invention is to provide a novel frame construction for an implement of this character and novel means for securing the different attachments in place on the frame.

Still another object of this invention is to provide a rotary cultivator assembly of improved design and adapted for easy and adjustable attachment on the frame of the implement.

The last object to be mentioned specifically is to provide a device of the mentioned character which will be economical to manufacture, simple, safe and convenient to operate, and which will give generally efficient and durable service.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 5 is an enlarged fragmentary, rear elevational view of the machine and designed particularly illustrating the general arrangement of the mechanism used to drive the ground wheels;

Figure 1:
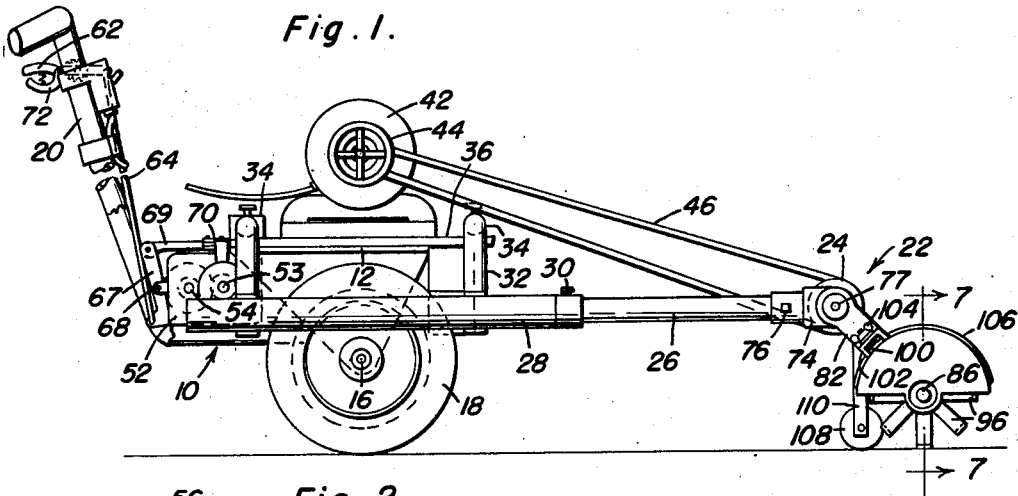
Figure 1 is a side elevational view of the implement adapted for use with a rotary cultivator assembly.
Figure 2:
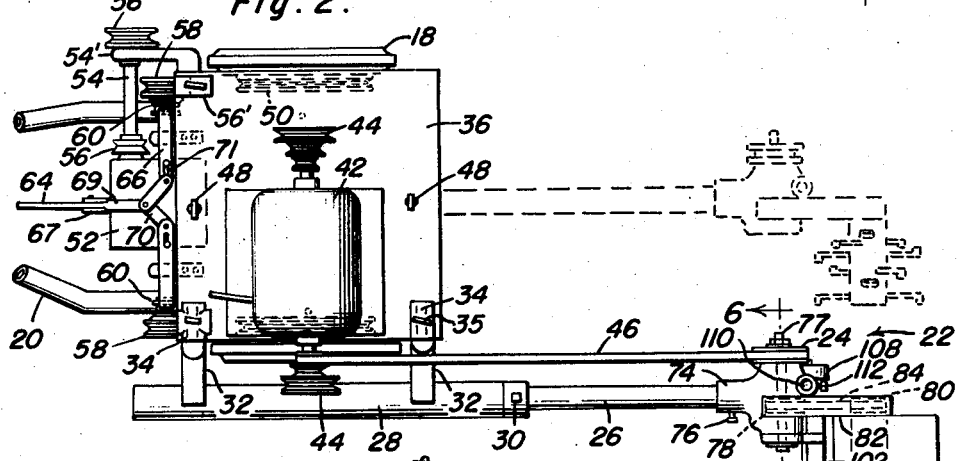
Figure 2 is a top plan view of the same, portions being broken away to conserve space, the rotary cultivator assembly being shown in the same position as in Figure 1 in full lines, and in a second position in dash lines.
Figures 3, 4:
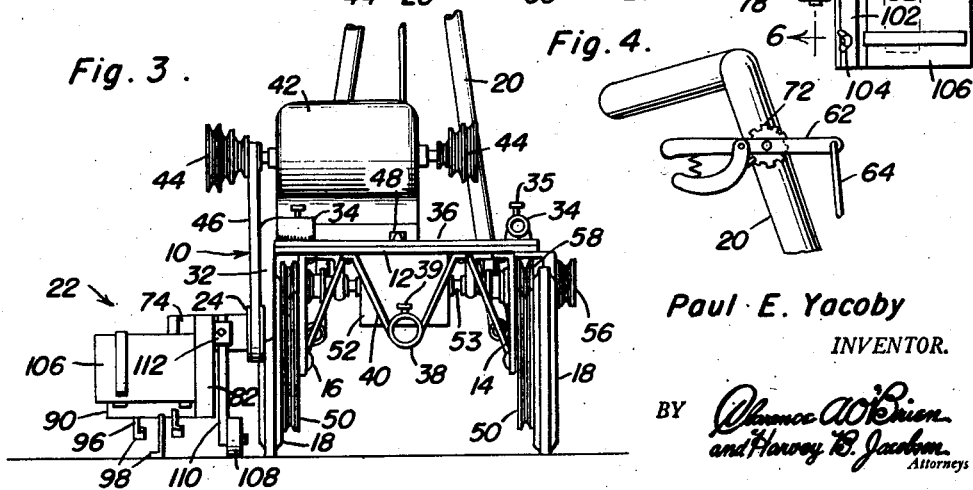
Figure 3 is a front elevational view of the implement with the cultivator assembly in the full line position of Figure 1.
Figure 4 is an enlarged fragmentary view of the upper end portion of the handle and parts carried thereby.

Figures 6 and 7 are vertical sectional views taken on the lines 6—6 and 7—7 in Figures 2 and 1, respectively;

Figure 8 is a front elevational view illustrating the implement adapted for use with the rotary cultivator assembly shifted into a different position than that shown in Figures 1 and 2;

Figure 9 is a fragmentary top plan view illustrating the implement adapted for use with a rotary mower assembly;

Figure 10 is a side elevational view illustrating the implement adapted for use with a reciprocating type mower;

Figure 11 is an enlarged fragmentary vertical sectional view showing the simple means used to secure the attachment plate carrying the motor on the bed plate of the frame; and Figure 12 is a top plan view of the structure illustrated in Figure 10.

Similar characters of reference designate similar or identical elements and parts throughout the specification and throughout the different views of the drawings.

Referring now to the drawings in detail, this invention includes a frame, generally indicated by the numeral 10, and of generally inverted U-shape, comprising a flat rectangular bed plate 12, depending side members 14 secured to the underside of the bed plate 12 and adapted to carry short aligned axles 16 whereon a pair of ground wheels 18 are mounted at opposite sides of said frame 10. A pair of guiding handle members 20 extend upwardly and rearwardly from the frame 10 and which are suitably attached to said members 14.

A rotary cultivator assembly, generally indicated by the numeral 22, is mounted upon the frame 10 and is driven by a drive pulley 24 which is indirectly mounted, as presently described, upon what will be hereinafter referred to as a shank 26 adjustably extending out of a sleeve 28, for setting inwardly or outwardly of said sleeve by the set screw 30, said sleeve 28 being carried by a pair of spaced arms 32 which are terminally secured within fastening means 34, preferably comprised of short hollow cylinders with a thumb screw 35, said fastening means 34 being secured upon corners of an attachment plate 36 which is of a size similar to the bed plate 12 and mounted thereon, as presently described. Another hollow cylindrical fastening means 38, also provided with a thumb screw 39, is mounted by means of bracket members 40 centrally upon the lower side of the bed plate 12, to extend longitudinally of the implement, the member 38 being adapted to receive and hold the shank 26 of the rotary cultivator assembly 22.

A motor 42, ordinarily an electric motor but not necessarily so, is mounted upon the attachment plate 36 and the motor 42 will have a pair of pulleys 44 secured at each end of a drive shaft of the motor, each pulley being preferably constructed of a plurality of differently sized sheaves. The belt 46 will be used to connect the drive pulley 24 with a sheave of either of the pulleys 44 selectively for a purpose presently seen. The foregoing will make it clear that the attachment plate 36 is to be shiftable into more than one position upon the bed plate 12, and bolts with wing nuts 48 will be used to secure the attachment plate in position after such adjustment.

Each of the ground contacting wheels 18 has a belt pulley 50. A gear casing 52 with a set of reduction gears indicated at 55 in Figure 5 therein is mounted upon a rear portion of the frame 10 and these gears connect the shaft 54 and the shaft 53. The shaft 54 carries a pair of pulleys 56 one of which is aligned with one of the pulleys 44 of the motor, when the motor and the attachment plate 36 are secured in one position as shown in Figure 2. It follows that said pulleys 56 and said one pulley 44 may be connected by a belt and the shaft 53 driven at reduced speed. The shaft 54 is supported by an arm 54' on the bed plate 12. An extra fastening means 56' like the means 34 is provided on the plate 36 for a tool, not shown. A pair of pulleys 58 are mounted on the shaft 53 and clutch means 60 will be associated operatively with each pulley 58. The clutch control means includes a lever 62 operatively mounted on the handle structure 20 and connected by an inflexible link 64 to the bars 66 by means of a rocker 67 pivoted on the frame as indicated at 68 and pivotally connected to another inflexible link 69 which operates a pair of toggle links 70 having their ends secured to the bars 66. In this manner, manual movement of the lever 62 will cause the bars 66 to slide longitudinally to operate the clutch means 60. Means for mounting the bars 66 for such sliding movement is diagrammatically illustrated at 71.

The shank 26 of the rotary cultivator assembly 22 carries a housing 74 on its outer end, this housing being adjustable on the shank 26 by means of a set screw 76. The drive pulley 24 is mounted on a shaft 77 journaled in the housing 74 and this shaft 77 also carries another pulley 78 operatively connected with a pulley 80 mounted upon a shaft 86 journaled in the lower forward end portion of an elongated casing 82 which may be integral with the housing 74. The hollow casing 82 accommodates a drive belt 84 connecting the pulleys 78 and 80. The shaft 86 is mounted within a member 88 which serves as a sleeve bearing for the shaft 86 and also supports a hollow cylindrical member 90 constituting a hub portion of the rotary cultivator assembly. The cylindrical member 90 or hub has a wall 92 which is apertured to receive a reduced portion of the shaft 86 and suitable means 94 is provided to retain the shaft 86 within the cylindrical member 90. A plurality of radiating arms 96 terminate in simple transversely disposed earth working members 98. The housing 74 carries a transversely disposed bar 100 which is securable to a channel member 102 by means of a bolt and wing nut 104, and the channel member 102 carries an arcuate shield 106 adapted to enclose the upper portion of the rotary portion of the cultivator assembly.

A ground contacting wheel 108 is mounted on the lower end of a bar 110 which is adjustably secured in a collar mounted upon the housing 74 and having a set screw 112. This wheel 108 may be turned to travel over the ground in the same direction as the other ground contacting wheels 18, even though the shaft 86 of the rotary member is disposed at right angles to the short axles 16, as illustrated in Figure 8.

In the above description, there has been described means whereby the machine may be made self-propelling, even though the illustrated structure does not indicate the machine as being self-propelled while the rotary cultivator assembly 22 is being used. However, in Figure 9, there is represented how a belt 114 may be used to connect the other pulley 56 with the other pulley 44 when the attachment plate 36 is shifted into another position and how a belt 116 will be used to connect another portion of the same pulley 44 with a drive pulley 118 of a rotary mower assembly generally indicated at 120. In such a use of this machine implement, the rotary mower assembly 120 will be equipped with attachment arms 122 which correspond with the arms 32 and are similarly secured in the fastening means 34 in order to mount the rotary mower assembly 120 on the frame. Another mower assembly 124 is illustrated in Figures 10 and 12, this assembly 124 representing a reciprocatory bladed mower, having attachment arms 126 and a drive pulley 128 which may be connected to one of the pulleys 44 by a belt 130. The attachments 120 and 124 are illustrated in this disclosure in order to indicate how this machine may be used with a plurality of such devices and is not limited to the use with the rotary cultivator assembly 22. In the position of the plate 36, shown in Figure 2, the shank 26 is disposed forwardly of the implement at one side thereof to similarly dispose the cultivator assembly 22. In another shifted position of said plate 36, shown in Figure 8, the shank 26 is disposed crosswise of the implement with the cultivator assembly at the other side of the implement and working crosswise of the implement. In this last position, the motor 42 does not drive the ground wheels 18.

The operation of this invention will be clearly understood from a consideration of the foregoing description of the mechanical details thereof, taken in connection with the drawings and with the above recited objects of this invention. In recapitulation, it will be clear that such attachment and the rotary cultivator assembly 22 may be secured in a variety of positions such as those positions indicated in Figures 1 and 8, and in the dash line representation in Figure 2. It will be clear that all the above recited objects are amply achieved by this invention. Further description would appear unnecessary. Minor variations from the embodiment disclosed may be resorted to within the spirit of the invention and the scope thereof should be determined only in accordance with the proper interpretation of the subjoined claims.

Having described the invention, what is claimed as new is:

1. An implement comprising a frame having a pair of ground contacting wheels and a flat bed plate, a motor having a flat attachment plate, a rotary tool assembly having a drive pulley, and adjustable arm means for securing said tool on the frame selectively in any one of a plurality of positions, said attachment plate being likewise selectively secured to said bed plate in any one of a plurality of positions so that the pulley may be belt driven from said motor when the rotary tool assembly is in any one of the aforesaid selected positions.

2. An implement comprising a frame having a pair of ground contacting wheels and a flat bed plate, a motor having a flat attachment plate, a rotary tool assembly having a drive pulley, and means for securing said tool on the frame selectively in any one of a plurality of positions, said attachment plate being likewise selectively secured to said bed plate in any one of a plurality of positions so that the pulley may be belt driven from said motor when the rotary tool assembly is in any one of the aforesaid selected positions, said means comprising an arm on said tool assembly and members on said attachment plate adjustably receiving said arm.

3. An implement comprising a frame having a pair of ground contacting wheels and a flat bed plate, a motor having a flat attachment plate, a rotary tool assembly having a drive pulley, and means for securing said tool on the frame selectively in any one of a plurality of positions, said attachment plate being likewise selectively secured to said bed plate in any one of a plurality of positions so that the pulley may be belt driven from said motor when the rotary tool assembly is in any one of the aforesaid selected positions, said tool assembly including a shank, and said bed plate having fastening means to selectively hold the shank in any one of a plurality of positions.

4. An implement comprising a frame having a pair of ground contacting wheels and a flat bed plate, a motor having a flat attachment plate, a rotary tool assembly having a drive pulley, and means for securing said tool on the frame selectively in any one of a plurality of positions, said attachment plate being likewise selectively secured to said bed plate in any one of a plurality of positions so that the pulley may be belt driven from said motor when the rotary tool assembly is in any one of the aforesaid selected positions, said tool assembly including a shank, a sleeve to receive said shank, spaced arms on said sleeve, and similarly spaced fastening members on said attachment plate for selectively receiving said arms.

5. An implement comprising a frame having a pair of ground contacting wheels and a flat bed plate, a motor having a flat attachment plate, a rotary cultivator assembly having a drive pulley, and means for securing said cultivator on the frame selectively in any one of a plurality of positions, said attachment plate being likewise selectively secured to said bed plate in any one of a plurality of positions so that the pulley may be belt driven from said motor when the rotary cultivator assembly is in any one of the aforesaid selected positions, said rotary cultivator assembly having a shank, a shaft rotatably mounted on one end of the shank and carrying said drive pulley, a toothed ground contacting element rotatably mounted on the shank adjacent said pulley and operatively connected with said shaft, a ground contacting wheel carried by said end of the shank, said means for securing comprising a sleeve on said shank, spaced arms on said sleeve, and fastening means on said attachment plate for selectively engaging said arms.

6. An implement according to claim 1, and including a shaft on said frame operatively connected to said motor, pulleys on said shaft and having clutches for releasably connecting the pulleys with the shaft, said ground contacting wheels having pulleys thereon, belts connecting the pulleys on said wheels to the pulleys on said shaft, a drive shaft carried by said frame and operatively connected to the first-named shaft, pulleys on the drive shaft, and pulleys on opposite sides of the motor at least one of which is aligned for belt connection to one of the pulleys on the drive shaft in each of the different positions of said attachment plate.

PAUL E. YACOBY.

REFERENCES CITED

The following references are of record in the file of this patent:

UNITED STATES PATENTS

| Number | Name | Date |
| --- | --- | --- |
| 1,047,262 | Matejowitz | Dec. 17, 1912 |
| 1,600,663 | Barrowman | Sept. 21, 1926 |
| 1,827,123 | Trively | Oct. 13, 1931 |